United States Patent
Abe et al.

(10) Patent No.: US 8,165,879 B2
(45) Date of Patent: Apr. 24, 2012

(54) VOICE OUTPUT DEVICE AND VOICE OUTPUT PROGRAM

(75) Inventors: Takatoshi Abe, Hamura (JP); Takuro Abe, Fussa (JP); Takashi Kojo, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1148 days.

(21) Appl. No.: 12/006,484

(22) Filed: Jan. 3, 2008

(65) Prior Publication Data

US 2008/0172226 A1  Jul. 17, 2008

(30) Foreign Application Priority Data

Jan. 11, 2007  (JP) ................................ 2007-003850
Jan. 25, 2007  (JP) ................................ 2007-014754

(51) Int. Cl.
*G10L 15/00* (2006.01)
*G10L 11/00* (2006.01)

(52) U.S. Cl. .. 704/251; 704/231; 704/270; 704/E15.043

(58) Field of Classification Search .................. 704/251, 704/270, 231, E15.043
See application file for complete search history.

(56) References Cited

U.S. PATENT DOCUMENTS

| | | | | |
|---|---|---|---|---|
| 5,099,425 A * | 3/1992 | Kanno Yuji et al. | ............... | 704/9 |
| 6,249,763 B1 * | 6/2001 | Minematsu | ................... | 704/252 |
| 7,447,627 B2 * | 11/2008 | Jessee et al. | .................... | 704/10 |
| 7,567,896 B2 * | 7/2009 | Coorman et al. | ............... | 704/10 |
| 7,720,215 B2 * | 5/2010 | Toriyama | ................. | 379/406.08 |
| 2004/0193398 A1 * | 9/2004 | Chu et al. | .......................... | 704/3 |
| 2006/0031072 A1 * | 2/2006 | Okutani et al. | ............... | 704/260 |
| 2006/0106604 A1 * | 5/2006 | Okimoto | ...................... | 704/243 |
| 2006/0247920 A1 * | 11/2006 | Toriyama | ...................... | 704/201 |

FOREIGN PATENT DOCUMENTS

CN  1093190 A  10/1994
(Continued)

OTHER PUBLICATIONS

Japanese Office Action dated Dec. 2, 2008, and English translation thereof issued in counterpart Japanese Application No. 2007-003850.

(Continued)

*Primary Examiner* — Vijay B Chawan
*Assistant Examiner* — Michael Ortiz Sanchez
(74) *Attorney, Agent, or Firm* — Holtz, Holtz, Goodman & Chick, PC

(57) ABSTRACT

A voice output device, includes: a compound word voice data storage unit that stores voice data in association with each of compound words which is formed of a plurality of words; a text display unit that displays text containing a plurality of words; a word designation unit that designates any of the words in the text displayed by the text display unit as a designated word based on a user's operation; a compound word detection unit that detects a compound word in which voice data is stored in the compound word voice data storage unit, from among the plurality of words in the text containing the designated word; and a voice output unit that outputs voice data corresponding to the compound word detected by the compound word detection unit as a voice.

5 Claims, 18 Drawing Sheets

FOREIGN PATENT DOCUMENTS

| | | | |
|---|---|---|---|
| CN | 1549150 | A | 11/2004 |
| JP | 58-92063 | A | 6/1983 |
| JP | 63-165925 | A | 7/1988 |
| JP | 63-228375 | A | 9/1988 |
| JP | 1-284900 | A | 11/1989 |
| JP | 3-232063 | A | 10/1991 |
| JP | 5-181909 | A | 7/1993 |
| JP | 2005-316947 | A | 11/2005 |
| JP | 2006-268496 | A | 10/2006 |
| JP | 2006-268501 | A | 10/2006 |

OTHER PUBLICATIONS

Japanese Office Action dated Dec. 2, 2008, and English translation thereof issued in counterpart Japanese Application No. 2007-014754.

Chinese Office Action dated Jun. 19, 2009 and English translation thereof issued in a counterpart Chinese Application No. 200810002630.7.

Korean Office Action dated Aug. 25, 2009 and English translation thereof issued in a counterpart Korean Application No. 10-2008-0002380.

* cited by examiner

FIG. 3

| HEADWORD | EXPLANATORY INFORMATION | | USAGE EXAMPLE NUMBER | IDIOM NUMBER | COMPOUND WORD NUMBER |
| --- | --- | --- | --- | --- | --- |
| | PHONETIC SYMBOL | MEANING CONTENT | | | |
| a | eɪ | 1. 1つの、1人の … | 1,23,45,… | … | … |
| … | | … | | | |
| batter | bǽtə(r) | … | … | … | ts0001,… |
| bread | bréd | 1. 食パン … | wr0001,… | … | ts0111,… |
| … | | … | | | |

| USAGE EXAMPLE NUMBER | EXAMPLE SENTENCE | TRANSLATION OF EXAMPLE SENTENCE 〜84a |
|---|---|---|
| wr0001 | a loaf [ roll, slice, piece ] of bread | パン1本 … |
| … | … | … |

FIG. 4B

| COMPOUND WORD NUMBER | COMPOUND WORD | EXPLANATORY INFORMATION OF COMPOUND WORD 〜84a |
|---|---|---|
| ts0001 | buttering ram | 打ちこわし用 … |
| ts0111 | bread and butter | 1. バター付きパン … |
| … | … | … |

FIG. 5

| HEADWORD | VOICE DATA |
|---|---|
| a | AA001.wav<br>( VOICE WAVEFORM OF 「a」 ) |
| ⋮ | ⋮ |
| batter | AA1199.wav<br>( VOICE WAVEFORM OF 「batter」 ) |
| battering ram | AA1200.wav<br>( VOICE WAVEFORM OF 「battering ram」 ) |
| ⋮ | ⋮ |
| bread | AA1320.wav<br>( VOICE WAVEFORM OF 「bread」 ) |
| bread and butter | AA1321.wav<br>( VOICE WAVEFORM OF 「bread and butter」 ) |
| | ⋮ |

NO TRUE VOICE OF SELECTED WORD IS PRESENT

FIG. 10B

NO TRUE VOICE OF SELECTED WORD IS PRESENT
DO YOU WANT OUTPUT OF READ VOICE?

⦿ YES
○ NO

SELECT, AND PRESS DECISION KEY

FIG. 16A    ··· and bread and butter for ···

FIG. 16B    ··· and bread and butter for ··· 

FIG. 16C    ··· and bread and butter for ··· 

FIG. 16D    ··· and bread and butter for ··· 

FIG. 16E    ··· and bread and butter for ··· 

FIG. 16F    ··· and bread and butter for ··· 

FIG. 16G    ··· and bread and butter for ··· 

FIG. 16H    ··· and bread and butter for ··· 

FIG. 16I    ··· and bread and butter for ··· 

FIG. 16J    ··· and bread and butter for ··· 

FIG. 16K    ··· and bread and butter for ···

VOICE OUTPUT DEVICE AND VOICE OUTPUT PROGRAM

BACKGROUND OF THE INVENTION

1. Field of the Invention

The present invention relates to a voice output device and a voice output program.

2. Description of the Related Art

Heretofore, a device such as an electronic dictionary for use in language learning has been enabled to output voice, and has synthesized voice data based on phonetic symbol information of a word or the like to output the synthesized voice data, and has outputted voice of recorded data of a prestored word or the like (for example, refer to JP-Tokukai-2006-268501A and JP-Tokukai-2006-268496A).

Incidentally, as an objective of the voice output by the electronic dictionary, there is a compound word made of a plurality of words.

However, when the voice of the compound word is outputted by such a method of synthesizing the voice data, connection between the words cannot be reproduced accurately, and a feeling of wrongness undesirably occurs in pronunciation of the compound word.

SUMMARY OF THE INVENTION

It is an object of the present invention to provide a voice output device and a voice output program, which are capable of outputting the voice of the compound word accurately by a simple operation.

According to one aspect of the present invention, a voice output device, comprises:

a compound word voice data storage unit that stores voice data in association with each of compound words which is formed of a plurality of words;

a text display unit that displays text containing a plurality of words;

a word designation unit that designates any of the words in the text displayed by the text display unit as a designated word based on a user's operation;

a compound word detection unit that detects a compound word in which voice data is stored in the compound word voice data storage unit, from among the plurality of words in the text containing the designated word; and a voice output unit that outputs voice data corresponding to the compound word detected by the compound word detection unit as a voice.

BRIEF DESCRIPTION OF THE DRAWINGS

FIG. 3 is a view showing a structure of a dictionary database;

FIGS. 4A and 4B are views showing structures of dictionary databases;

FIG. 5 is a view showing a structure of a voice database;

FIGS. 10A and 10B are views showing examples of messages displayed in the dictionary retrieval processing;

FIGS. 16A to 16K are conceptual views showing display contents and the like in the dictionary retrieval processing.

DETAILED DESCRIPTION OF PREFERRED EMBODIMENT

With reference to the drawings, a description will be made below in detail of the embodiment of the case where a voice output device according to the present invention is applied to an electronic dictionary.

First, a description will be made of a configuration of the electronic dictionary.

[External Configuration]

Figure 1:
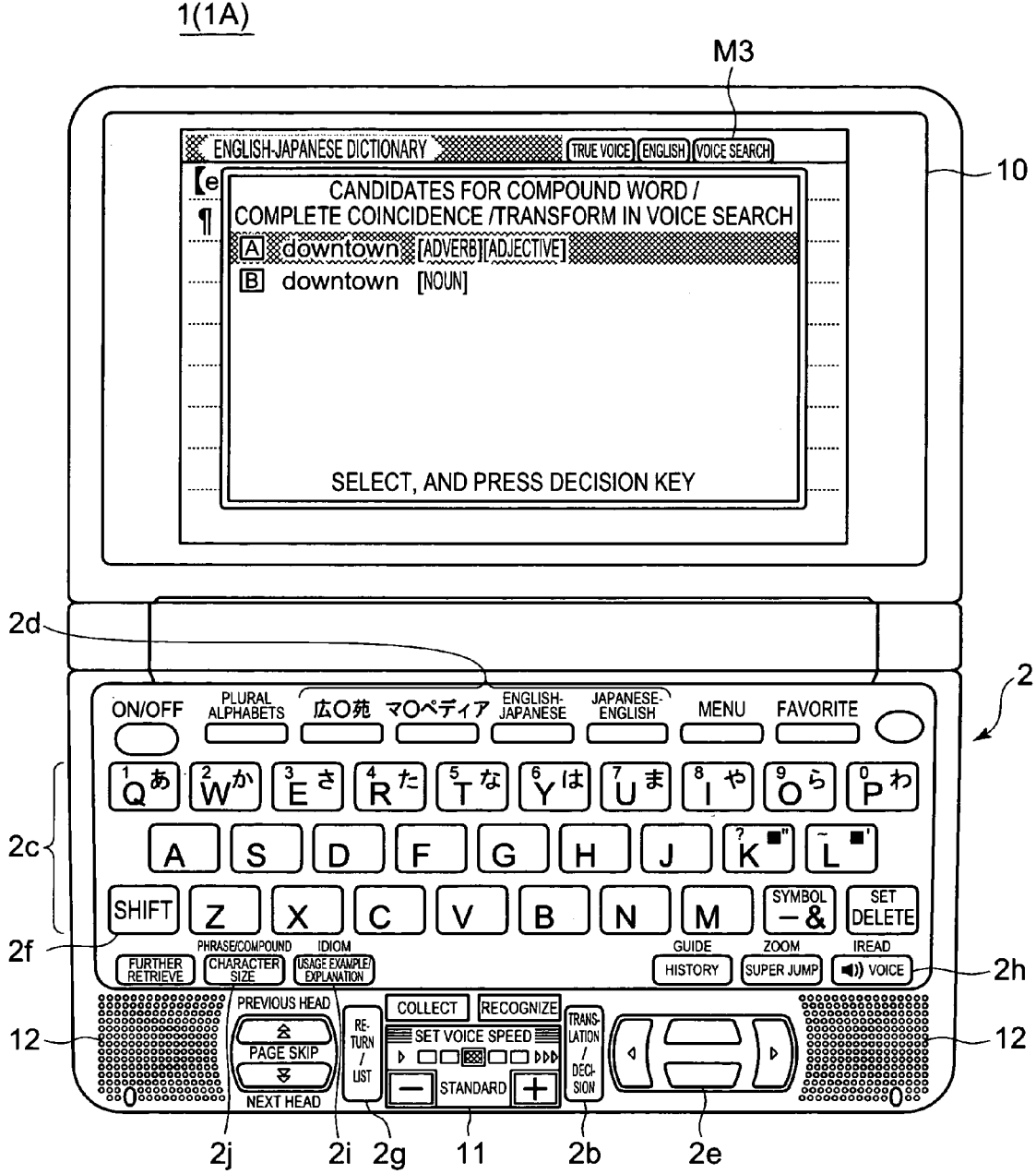
FIG. 1 is a plan view showing an electronic dictionary to which a voice output device according to the present invention is applied.

FIG. 1 is a plan view of an electronic dictionary 1.

As shown in FIG. 1, the electronic dictionary 1 includes a main display 10, a sub display 11, speakers 12, and a key group 2.

The main display 10 and the sub display 11 are portions which display a variety of data, such as characters and symbols, corresponding to an operation for the key group 2 by a user. The main display 10 and the sub display 11 are composed of liquid crystal displays (LCDs), electronic luminescent displays (ELDs), and the like. Note that the sub display 11 in this embodiment is formed into a so-called touch panel, and by pressing a surface of the touch panel, it is possible to perform an input operation corresponding to a pressed position thereof.

The speakers 12 are portions which output voice of a headword, an example sentence or the like, according to the operation for the key group 2 by the user.

The key group 2 has a variety of keys for operating the electronic dictionary 1. Specifically, the key group 2 includes a translation/decision key 2b, character keys 2c, dictionary selection keys 2d, cursor keys 2e, a shift key 2f, a return key 2g, a voice output key 2h, a usage example key 2i, a compound word key 2j, and the like.

The translation/decision key 2b is a key for use in executing retrieval, deciding the headword, and the like. The character keys 2c are keys to be used when the user inputs the characters and the like, and in this embodiment, the character keys 2c include keys of "A" to "Z". The dictionary selection key 2d is a key for use in selecting dictionary databases 84 (refer to FIG. 2) to be described later.

The cursor keys 2e are keys for use in moving a highlighted position on a screen, that is, a cursor position, and in this embodiment, the cursor keys 2e are capable of designating upper, lower, left and right directions. The shift key 2f is a key for use in the case of setting a Japanese word as a retrieval objective, and the like. The return key 2g is a key for use in the case of returning to a screen displayed last time, and the like.

The voice output key 2h is a key pressed in the case of outputting the voice of the selected headword, compound word and the like. The usage example key 2i is a key pressed in the case of displaying an example sentence containing the selected headword and the like. The compound word key 2j is a key pressed in the case of displaying phrase/compound word containing the selected headword.

[Internal Configuration]

Figure 2:
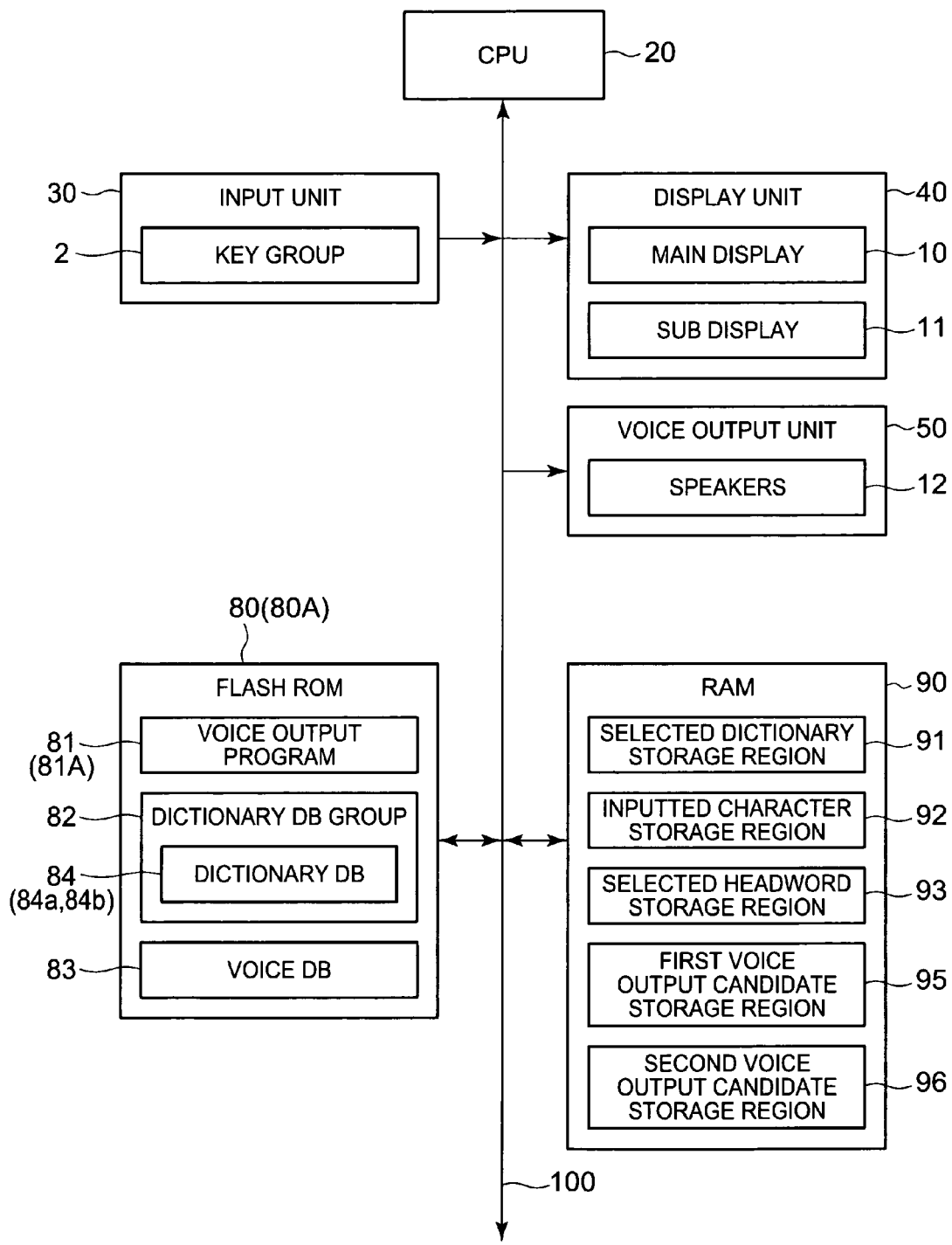
FIG. 2 is a block diagram showing a schematic configuration of the electronic dictionary to which the voice output device according to the present invention is applied.

Subsequently, a description will be made of an internal configuration of the electronic dictionary 1. FIG. 2 is a block diagram showing an internal configuration of the electronic dictionary 1.

As shown in FIG. 2, the electronic dictionary 1 includes a display unit 40, an input unit 30, a voice output unit 50, a central processing unit 20, a flash read only memory (ROM) 80, and a random access memory 90 (RAM). In the electronic dictionary 1, above sections are interconnected so as to be capable of data communication thereamong.

The display unit 40 includes the above-described main display 10 and sub display 11, and is adapted to display various kinds of information on the main display 10 and the sub display 11 based on a display signal inputted from the CPU 20.

The input unit 30 includes the above-described key group 2, and is adapted to output a signal corresponding to a pressed key, to the CPU 20.

The voice output unit 50 includes the above-described speakers 12, and is adapted to allow the speakers 12 to reproduce voice data based on a voice input signal inputted from the CPU 20.

The CPU 20 executes processing based on a predetermined program in response to the inputted instruction, instructs each functional units and transfers data therebetween, and the like to control the electronic dictionary 1 in a centralized manner. Specifically, the CPU 20 reads out a variety of programs stored in the flash ROM 80 in response to an operation signal or the like inputted from the input unit 30, and executes the processing in accordance with the programs. Then, the CPU 20 stores results of the processing in the RAM 90, and allows the display unit 40 and the voice output unit 50 to appropriately output the results of the processing.

The flash ROM 80 is a memory that stores the programs and the data for realizing a variety of functions of the electronic dictionary 1. In this embodiment, the flash ROM 80 stores a voice output program 81 according to the present invention, a dictionary database group 82, a voice database 83, and the like.

The voice output program 81 is a program for allowing the CPU 20 to execute dictionary retrieval processing (refer to FIG. 6 to FIG. 9) to be described later.

The dictionary database group 82 has a plurality of dictionary databases 84, and in this embodiment, the dictionary database group 82 has a dictionary database 84a of an English-Japanese dictionary, a dictionary database 84b of an English-English dictionary, and the like.

In these dictionary databases 84, for example, as shown as an example in FIG. 3, explanatory information formed of phonetic symbols and meaning contents; usage example numbers for identifying example sentences (usage examples) of the headwords; idiom numbers for identifying idioms containing the headwords; compound word numbers for identifying phrases/compound words; and the like, are stored in association with a plurality of the headwords. Moreover, in each dictionary database 84, for example, as shown as examples in FIGS. 4A and 4B, a table in which example sentences and translations corresponding thereto are associated with the above-described usage example numbers; a table in which phrases/compound words and explanatory information of the phrases/compound words are associated with the above-described compound word numbers; a table in which idioms and explanatory information of the idioms are associated with the above-described idiom numbers; and the like, are stored. Note that, in this embodiment, the explanatory information in each dictionary database 84 is text data.

Moreover, in the voice database 83, for example, as shown as an example in FIG. 5, voice data, so-called "true voice", by pronunciation of a native speaker are stored in association with the headwords, the phrases/compound words and the like.

The RAM 90 includes memory regions which temporarily store the variety of programs executed by the CPU 20, data related to the execution of these programs, and the like. In this embodiment, the RAM 90 includes a selected dictionary storage region 91, an inputted character storage region 92, a selected headword storage region 93, a first voice output candidate storage region 95, and a second voice output candidate storage region 96.

Here, in the selected dictionary storage region 91, identification information of the dictionary database 84 selected by the user as an objective for retrieving the headword, is stored, and in the inputted character storage region 92, inputted characters inputted by the user are stored. Moreover, in the selected headword storage region 93, a selected headword selected by the user as a headword to be looked up in the dictionary, is stored. In this embodiment, the selected headword is selected from a list of the headwords read out from the dictionary database in the alphabetical order or in the order of the Japanese kana syllabary so as to carry out a prefix search between the inputted character and the designated character.

Moreover, in the first voice output candidate storage region 95 and the second voice output candidate storage region 96, each of the listed word strings set as candidates of objectives for which the voice is to be outputted in voice search processing (refer to FIG. 8 and FIG. 9) to be described later, is stored as a main candidate list and a sub candidate list.

[Operations]

Subsequently, a description will be made of an operation of the electronic dictionary 1. FIG. 6 to FIG. 9 are flowcharts showing a flow of the dictionary retrieval processing which the CPU 20 executes by reading out the voice output program 81.

Figure 6:
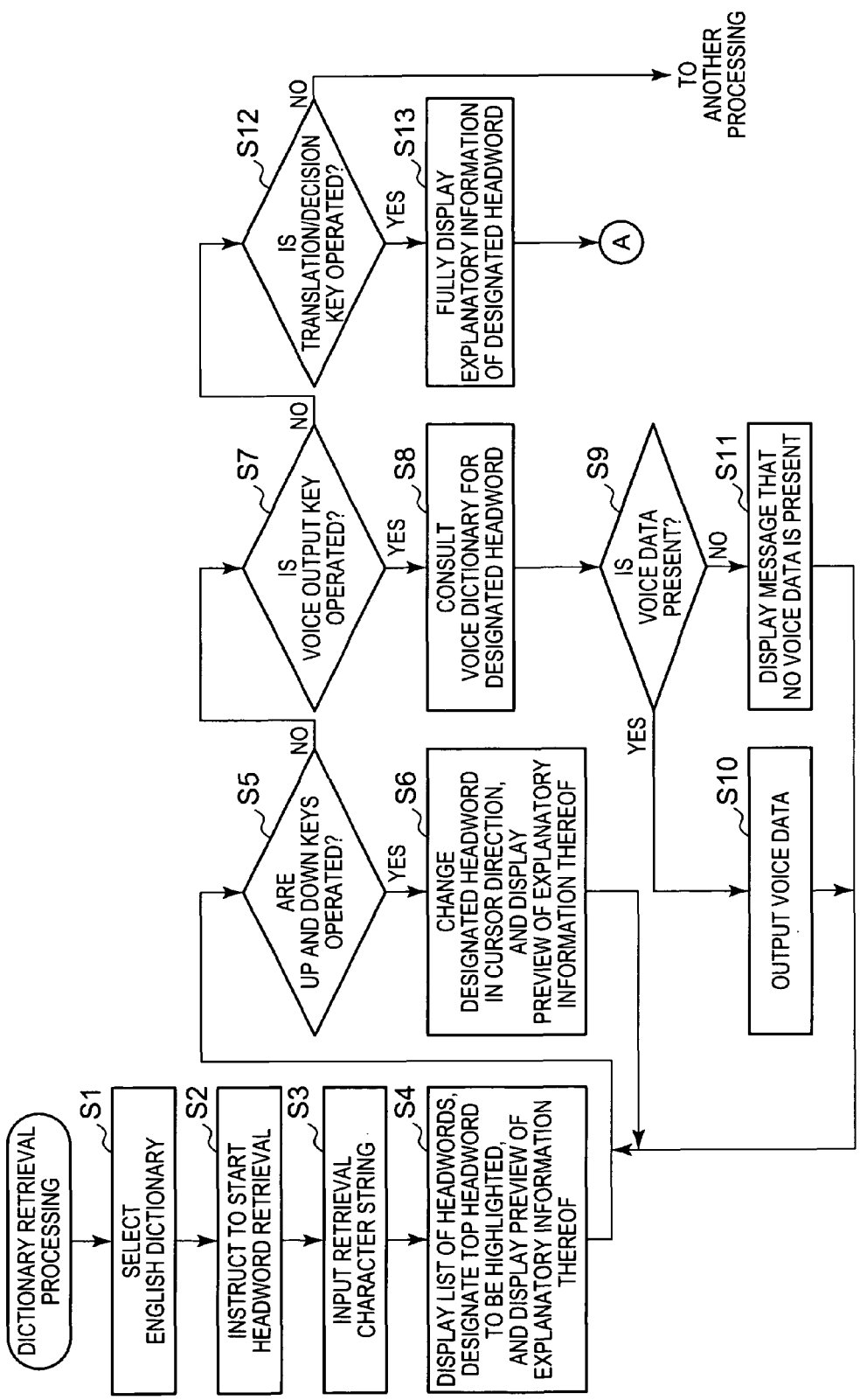
FIG. 6 is a flowchart showing operations of dictionary retrieval processing.

First, as shown in FIG. 6, the dictionary selection key 2d is pressed by the user, and any of the dictionary databases 84 is selected from the dictionary database group 82 (Step S1). Thereafter, headword retrieval is instructed to be started (Step S2), and a retrieval character string is inputted (Step S3). Then, the CPU 20 extracts candidates of the headword, which correspond to the inputted retrieval character string, from the selected dictionary database 84, and allows the main display 10 to display a list of the extracted candidates. Moreover, the CPU 20 designates a top headword so that the top headword is highlighted as an objective of highlight display, retrieves explanatory information of the top headword from the dictionary database 84, and allows the main display 10 to display a preview of the explanatory information on another region which is different from that of the headword list (Step S4).

Note that, in this embodiment, the description will be made on the assumption that the dictionary database 84 in which at least one of the headwords and the explanatory information is described in English is selected in the processing of Step S1. Moreover, the description will be made on the assumption that when a separate compound word is inputted in the processing of Step S3, the constituent words in the separate compound word are coupled to each other.

Next, the CPU 20 determines whether or not up and down keys of the cursor keys 2e are operated by the user (Step S5). Then, in the case that it is determined that the up and down keys are operated (Step S5: Yes), the CPU 20 changes the headword to be designated to be highlighted, in a cursor direction in the headword list, retrieves explanatory information of the changed headword from the dictionary database 84, and allows the main display 10 to display a preview of the explanatory information on another region which is different from that of the headword list (Step S6). Then, the CPU 20 proceeds to the processing of Step S5 described above.

Meanwhile, in the case that it is determined that the up and down keys are not operated (Step S5: No), the CPU 20 determines whether or not the voice output key 2h is operated by the user (Step S7). In the case that it is determined that the voice output key 2h is operated (Step S7: Yes), the CPU 20 retrieves voice data corresponding to the headword designated to be highlighted in the voice database 83 (Step S8), and determines whether or not the voice data is present (Step S9). Then, in the case that it is determined in Step S9 that the voice data is present (Step S9: Yes), the CPU 20 allows the voice output unit 50 to output the voice data as a voice (Step S10), and then proceeds to the processing of Step S5 described above. Meanwhile, in the case that it is determined in Step S9 that the voice data is not present (Step S9: No), the CPU 20 allows the main display 10 to display a message that the voice data is not present as shown in FIG. 10A (Step S11), and then proceeds to the processing of Step S5 described above.

Meanwhile, in the case that it is determined in Step S7 that the voice output key 2h is not operated (Step S7: No), the CPU 20 determines whether or not the translation/decision key 2b is operated by the user (Step S12). In the case that it is determined that the translation/decision key 2b is not operated (Step S12: No), the CPU 20 proceeds to another processing.

Meanwhile, in the case that it is determined in Step S12 that the translation/decision key 2b is operated (Step S12: Yes), the CPU 20 allows the main display 10 to fully display the explanatory information of the headword designated to be highlighted (Step S13). At this time, in the case where a compound word containing the displayed headword is stored in the dictionary database 84, the CPU 20 allows the main display 10 to display a compound word mark M1 (refer to FIG. 13) indicating that the compound word is stored, on an upper right portion thereof. Moreover, in the case where usage examples of the headword are stored in the dictionary database 84, the CPU 20 allows the main display 10 to display usage example marks M2 (refer to FIG. 13), which indicate that the usage examples are stored, individually on portions for meaning contents in which the usage examples are stored.

Figure 7:
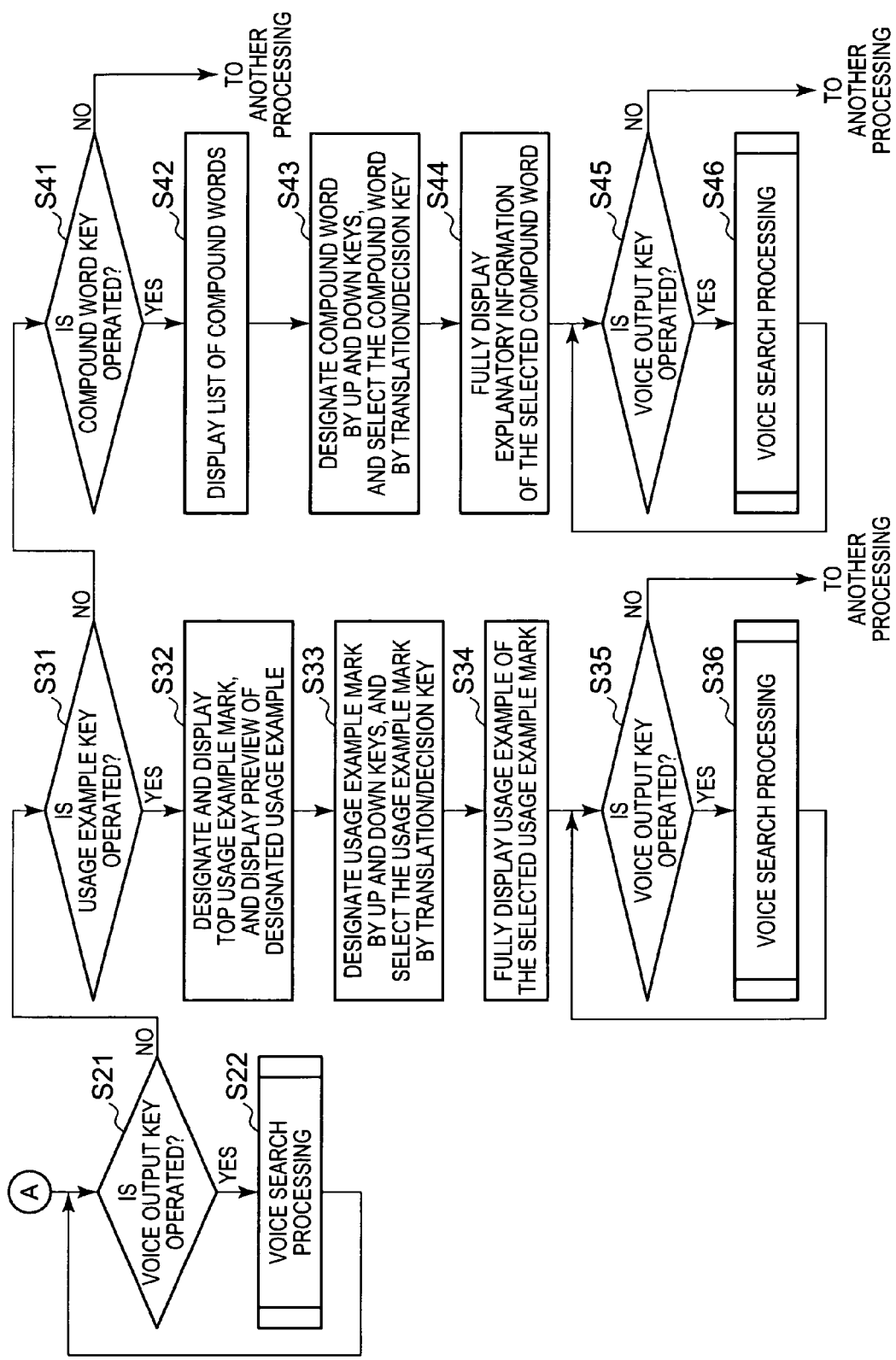
FIG. 7 is a flowchart showing operations of the dictionary retrieval processing.

Next, as shown in FIG. 7, the CPU 20 determines whether or not the voice output key 2h is operated (Step S21). In the case that it is determined that the voice output key 2h is operated (Step S21: Yes), the CPU 20 performs the voice search processing (Step S22).

Figure 8:
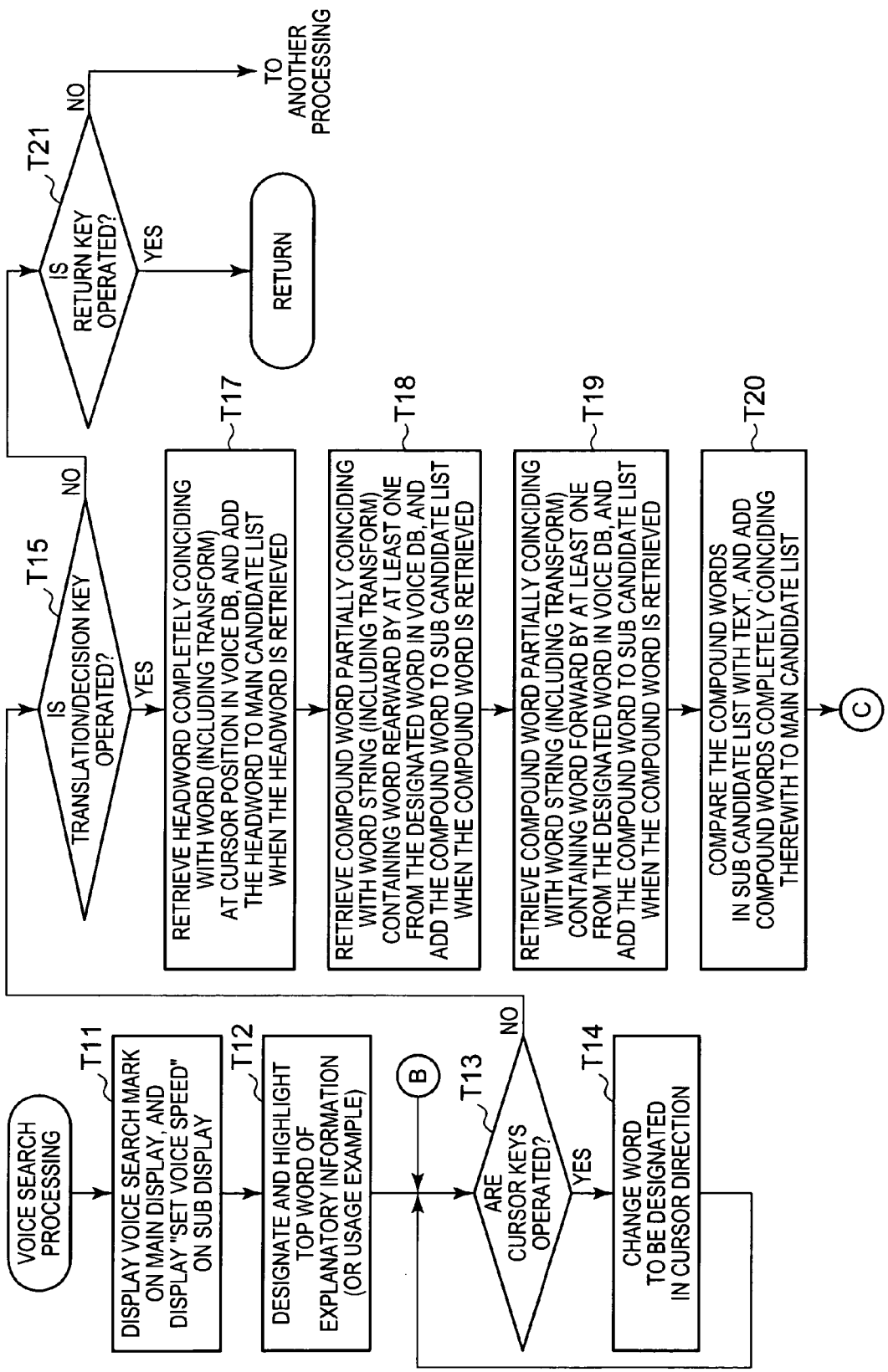
FIG. 8 is a flowchart showing operations of voice search processing.

Specifically, as shown in FIG. 8, the CPU 20 first allows the main display 10 of the display unit 40 to display a voice search mark M3 (refer to FIG. 13 and the like) indicating that the voice search processing is under execution, and allows the sub display 11 to display a speed setting screen (refer to FIG. 1) for voice output (Step T11). Note that, in a state where the speed setting screen is displayed, the user presses a predetermined region of the sub display 11. Thereby, an output speed of the voice is changed to an arbitrary speed.

Next, the CPU 20 designates the top headword in the explanatory information or the usage example, which is displayed on the main display 10, to highlight the top headword (Step T12), and then determines whether or not the cursor keys 2e are operated by the user (Step T13). In the case that it is determined that the cursor keys 2e are operated (Step S13: Yes), the CPU 20 changes the word designated to be highlighted (hereinafter, referred to as a designated word) in the cursor direction (Step T14), and proceeds to the processing of Step T13 described above.

Meanwhile, in the case that it is determined in Step T13 that the cursor keys 2e are not operated (Step T13: No), the CPU 20 determines whether or not the translation/decision key 2b is operated by the user (Step T15).

In the case of that it is determined in Step T15 that the translation/decision key 2b is operated (Step T15: Yes), the CPU 20 retrieves a headword that completely coincides with the designated word or a transformed word of the designated word, from the voice database 83. In the case of retrieving the headword, the CPU 20 adds the headword as a voice output candidate to the main candidate list of the first voice output candidate storage region 95 (Step T17).

Note that, as such a transformed word, for example, there are words of an infinitive, a past verb, a past participle, and a declension, which are for a word composing an infinitive verb; words of a positive degree, a comparative form, and a superlative form, which are for a word composing a positive degree adjective; and the like. Moreover, as a method of acquiring the transformed word of the constituent words, a method conventionally known in public can be used. For example, the method is to refer to a table in which the transformed words are stored in association with each of the words, and the like.

Next, from the voice database 83, the CPU 20 retrieves a compound word which partially coincides with a word string that contains a word rearward by at least one from the designated word and with a transformed word string in which at least one constituent word is converted into a transformed word. In the case of retrieving the compound word, the CPU 20 adds the compound word as a voice output candidate to the sub candidate list of the second voice output candidate storage region 96 (Step T18). In a similar way, the CPU 20 retrieves a compound word which partially coincides with a word string that contains a word forward by at least one from the designated word and with a transformed word string in which at least one constituent word is converted into a transformed word. In the case retrieving the compound word, the CPU 20 adds the compound word as a voice output candidate to the sub candidate list of the second voice output candidate storage region 96 (Step T19). Note that, as the transformed word string, there is a word string in which the constituent words are coupled to each other by a hyphen and the like, besides the word string in which the constituent word is converted into the transformed word.

Next, the CPU 20 compares the compound word in the sub candidate list in the second voice output candidate storage region 96 with the word string that contains the designated word and is displayed on the main display 10, and with the transformed word string thereof. Then, the CPU 20 adds the compound words which completely coincide with the word strings or the transformed word strings, as voice output candidates to the main candidate list of the first voice output candidate storage region 95 (Step T20).

In such a way, a compound word which contains the designated word as a top or a second and after constituent word and is displayed in the text, and in which the voice data is stored, is detected, and is added to the main candidate list of the first voice output candidate storage region 95.

Figure 9:
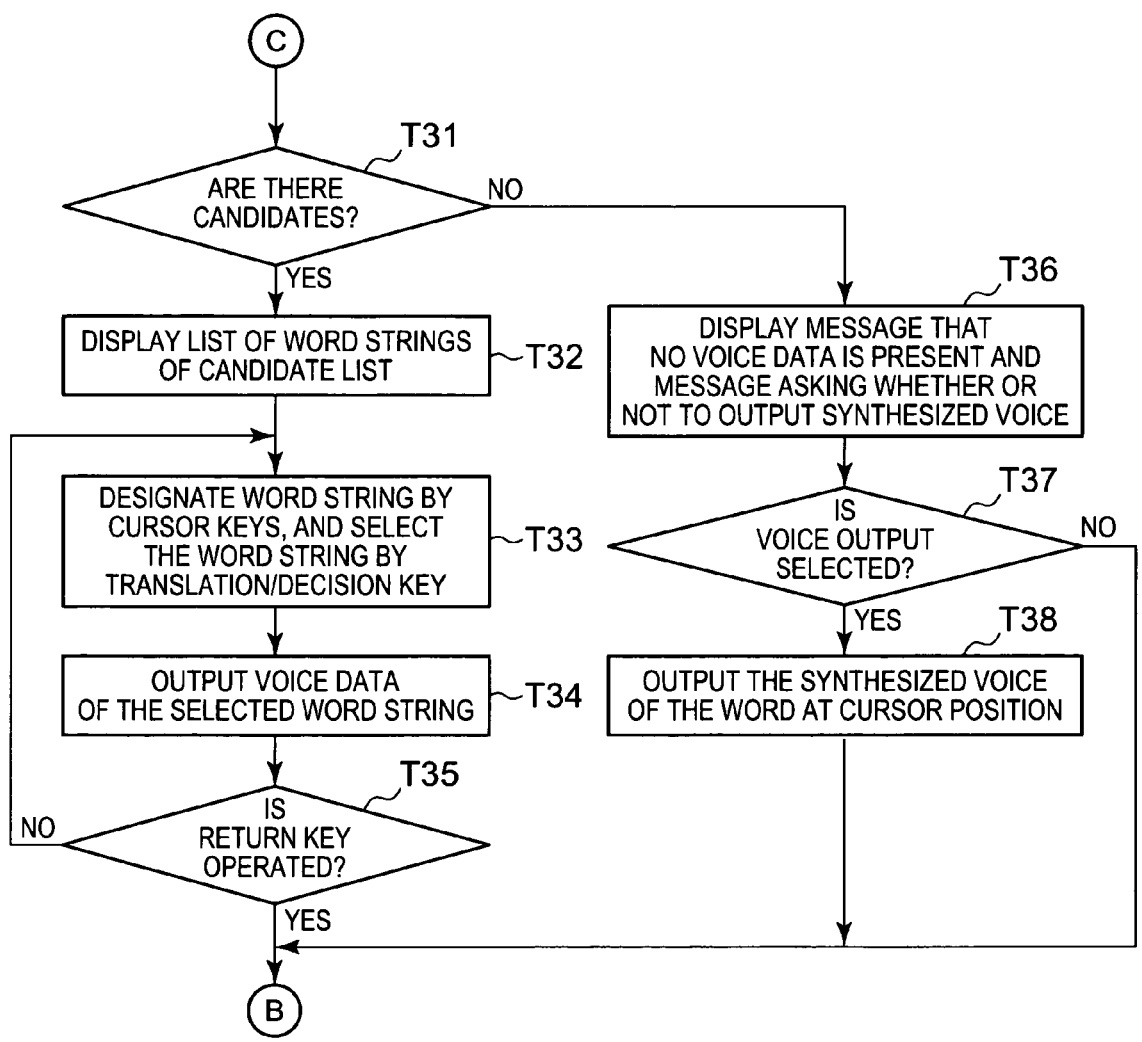
FIG. 9 is a flowchart showing operations of the voice search processing.

Next, as shown in FIG. 9, the CPU 20 determines whether or not the voice output candidates are stored in the first voice output candidate storage region 95 (Step T31). In the case that it is determined that the voice output candidates are stored (Step T31: Yes), the CPU 20 allows the main display 10 to display a list of the word strings of the main candidate list (Step T32). Then, when any of the word strings is designated by the user by means of the cursor keys 2e, and is selected by the translation/decision key 2b (Step T33), the CPU 20 allows the voice output unit 50 to output the voice data of the selected word string as a voice (Step T34).

Next, the CPU 20 determines whether or not the return key 2g is operated by the user (Step T35). In the case that it is determined that the return key 2g is not operated (Step T35: No), the CPU 20 proceeds to the processing of Step T33 described above. Meanwhile, in the case that it is determined that the return key 2g is operated (Step T35: Yes), the CPU 20 proceeds to the processing of Step T13 described above as shown in FIG. 8.

Meanwhile, as shown in FIG. 9 and FIG. 10B, in the case that it is determined in Step T31 described above that no candidate for the voice output is present (Step T31: No), the CPU 20 allows the main display 10 to display a message that no candidate is present and a message asking whether or not to output synthesized voice for the designated word (Step T36). Thereafter, the CPU 20 determines whether or not the voice output is selected (Step T37). In the case that it is determined that the voice output is not selected (Step T37: No), the CPU 20 proceeds to the processing of Step T13 described above as shown in FIG. 8.

Meanwhile, as shown in FIG. 9, in the case that it is determined in Step T37 that the voice output is selected (Step T37: Yes), the CPU 20 generates synthesized voice data of the designated word based on phonetic symbols thereof, and allows the voice output unit 50 to output the synthesized voice data as a voice (Step T38). Thereafter, as shown in FIG. 8, the CPU 20 proceeds to the processing of Step T13 described above. Note that, as a method of outputting the synthesized voice data as a voice based on the phonetic symbols, a method conventionally known in public can be used. For example, the method is to decompose text data of phonetic symbols into phonemes in a state where voice data corresponding to each phoneme is prestored in the flash ROM 80 or the like, and then to synthesize voice data corresponding to each decomposed phoneme, and to continuously reproduce the voice data, and the like. However, the synthesized voice may be outputted based on text data of the word itself without outputting the synthesized voice based on the text data of the phonetic symbols.

Meanwhile, in the case that it is determined in Step T15 described above that the translation/decision key 2b is not operated (Step T15: No), the CPU 20 determines whether or not the return key 2g is operated by the user (Step T21). In the case that it is determined that the return key 2g is not operated (Step T21: No), the CPU 20 proceeds to another processing. Meanwhile, in the case that it is determined that the return key 2g is operated (Step T21: Yes), the CPU 20 proceeds to the processing of Step S21 described above as shown in FIG. 7 after ending the voice search processing.

Meanwhile, in the case that it is determined in Step S21 that the voice output key 2h is not operated (Step S21: No), the CPU 20 determines whether or not the usage example key 2i is operated by the user (Step S31). In the case that it is determined that the usage example key 2i is operated (Step S31: Yes), then, among the usage example marks M2 displayed on the main display 10 in Step S13 described above, the CPU 20 designates the top usage example mark M2 to highlight the top usage example mark M2, and allows the main display 10 to display a preview of a usage example having meaning contents corresponding to the usage example mark on another region which is different from that of the explanatory information of the headword (Step S32).

Next, when any of the usage example marks M2 is designated by the user by means of the up and down keys of the cursor keys 2e, and is selected by the translation/decision key 2b (Step S33), the CPU 20 allows the main display 10 to fully display a usage example having meaning contents corresponding to the selected usage example mark (Step S34).

Next, the CPU 20 determines whether or not the voice output key 2h is operated (Step S35). In the case that it is determined that the voice output key 2h is not operated (Step S35: No), the CPU 20 proceeds to another processing. In the case that it is determined that the voice output key 2h is operated (Step S35: Yes), the CPU 20 performs voice search processing similar to that of Step S22 described above (Step S36), and then proceeds to the processing of Step S35 described above.

Meanwhile, in the case that it is determined in Step S31 described above that the usage example key 2i is not operated (Step S31: No), the CPU 20 determines whether or not the compound word key 2j is operated by the user (Step S41). In the case that it is determined that the compound word key 2j is not operated (Step S41: No), the CPU 20 proceeds to another processing.

Meanwhile, in the case that it is determined in Step S41 that the compound word key 2j is operated (Step S41: Yes), the CPU 20 allows the main display 10 to display a list of compound words containing the designated word (Step S42). Then, when any of the compound words is designated by the user by means of the up and down keys of the cursor keys 2e, and the translation/decision key 2b is selected (Step S43), the CPU 20 allows the main display 10 to fully display explanatory information of the selected compound word (Step S44).

Next, the CPU 20 determines whether or not the voice output key 2h is operated by the user (Step S45). In the case that it is determined that the voice output key 2h is not operated (Step S45: No), the CPU 20 proceeds to another processing. In the case that it is determined that the voice output key 2h is operated (Step S45: Yes), the CPU 20 performs voice search processing similar to that of Step S22 described above, and proceeds to the processing of Step S45 described above.

OPERATION EXAMPLES

Subsequently, while referring to the drawings, a description will be specifically made of the above-mentioned dictionary retrieval processing. Note that, in FIGS. 11A to 11D and the like, an overall view of the electronic dictionary 1 is shown on left sides in the drawings so as to be simplified, and operation procedures are shown on right sides in the drawings.

Operation Example 1

Figure 11A:
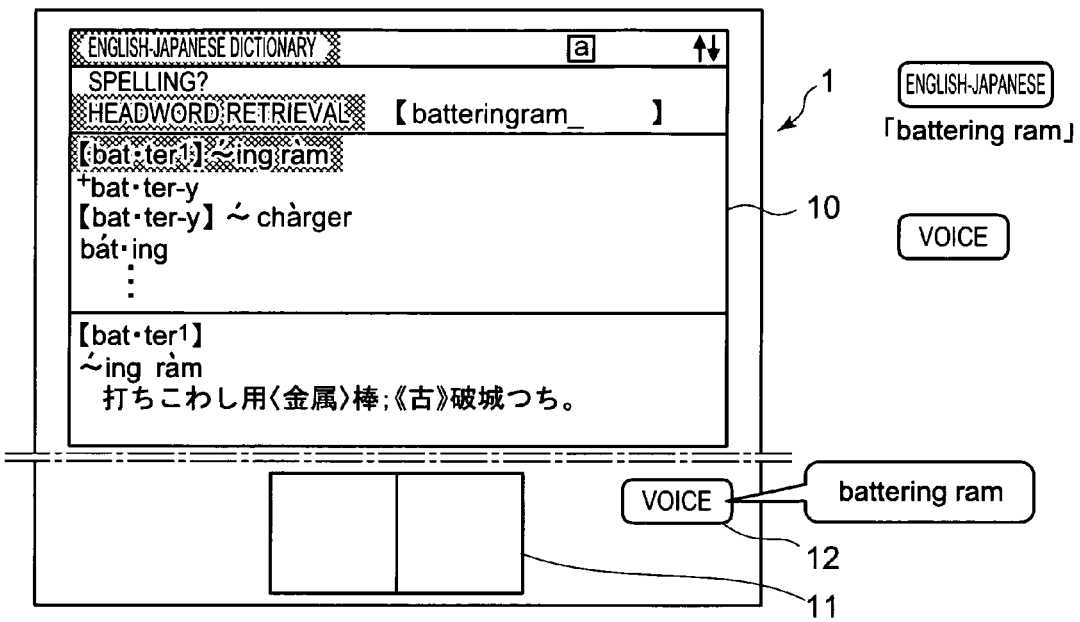
FIGS. 11A to 11D are conceptual views showing display contents and the like in the dictionary retrieval processing.

For example, as shown in FIG. 11A, the dictionary database 84a of the English-Japanese dictionary is selected by the user (Step S1), and "batteringram" is inputted as the retrieval character string (Step S3). Then, candidates "batter", "battery" . . . for the headword, which correspond to the retrieval character string, are displayed as a list on a middle stage of the main display 10. In addition, the top headword "[batter]-ing ram" is designated so as to be highlighted, and explanatory information thereof is displayed as a preview on a lower stage of the main display 10 (Step S4).

Next, when the voice output key 2h is operated by the user (Step S7: Yes), the headword "[batter]-ing ram" designated so as to be highlighted is outputted as voice (Step S10).

Figure 11B:
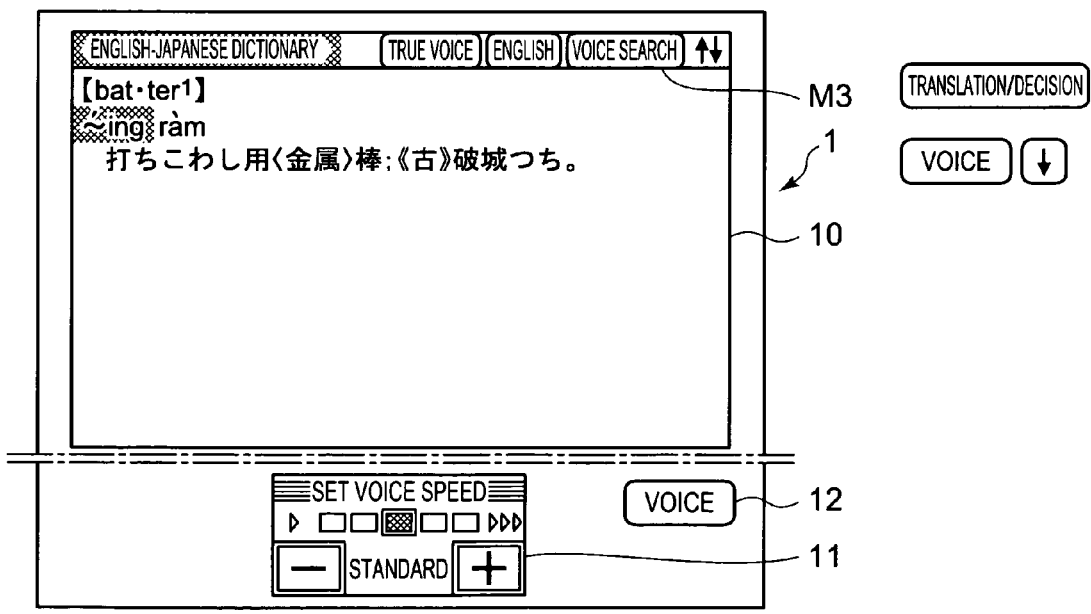

Next, as shown in FIG. 11B, when the translation/decision key 2b is operated by the user (Step S12: Yes), the explanatory information of the headword "[batter]-ing ram" designated so as to be highlighted is fully displayed (Step S13). Moreover, when the voice output key 2h is operated by the user (Step S21: Yes), the voice search mark M3 is displayed on the main display 10, and the speed setting screen for the voice output is displayed on the sub display 11 (Step T11).

Next, the top word "batter" of the explanatory information displayed on the main display 10 is designated so as to be highlighted (Step T12), and thereafter, when the down key of the cursor keys 2e is operated by the user (Step T13: Yes), the word "-ing" in the word string "-ingram" is designated so as to be highlighted in the cursor direction (Step T14).

Figure 11C:
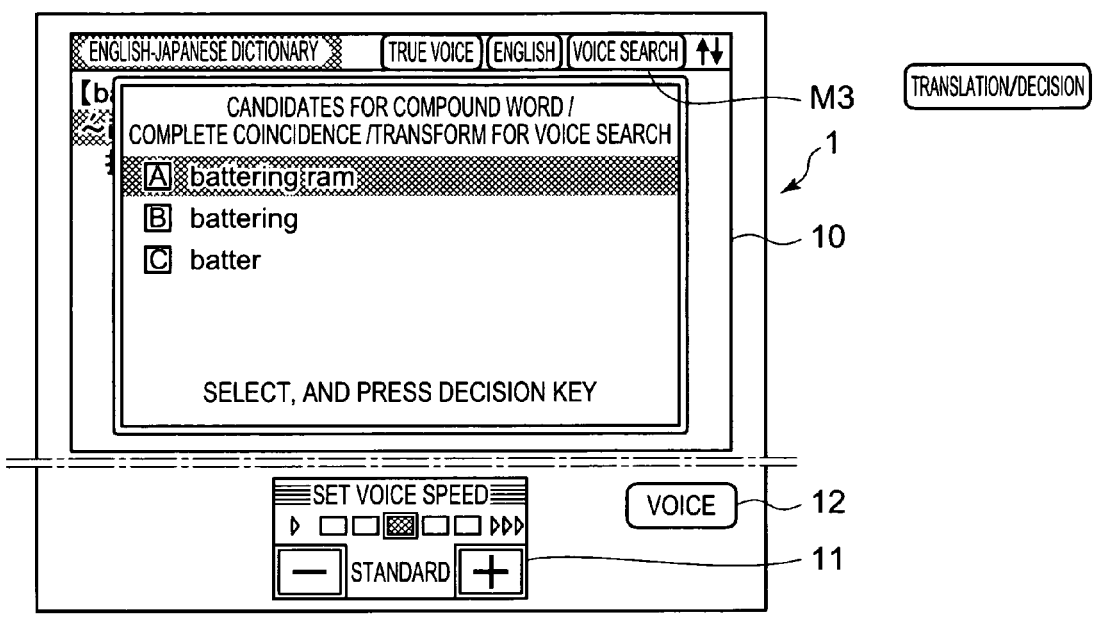

Next, as shown in FIG. 11C, when the translation/decision key 2b is operated by the user (Step T15: Yes), headwords "battering" and "batter" which completely coincide with the word "-ing" designated so as to be highlighted and the transformed word "batter" thereof are retrieved from the voice database 83, and are added to the main candidate list of the first voice output candidate storage region 95 (Step T17).

Next, a compound word "battering ram" which partially coincides with a word string "battering ram" that contains a word rearward by at least one from the designated word "-ing", is retrieved from the voice database 83, and is added to the sub candidate list of the second voice output candidate storage region 96 (Step T18).

Next, a compound word which partially coincides with a word string that contains a word forward by at least one from the designated word "-ing", is retrieved. However, in this case, no compound word is present forward of the designated word "-ming", and accordingly, no compound word is detected (Step T18).

Next, the compound word "battering ram" in the sub candidate list of the second voice output candidate storage region 96 and the word string "battering ram" that contains the designated word and is displayed on the main display 10 are compared with each other, and the compound word "battering ram" that completely coincides with the word string is added to the main candidate list of the first voice output candidate storage region 95 (Step T20).

Next, the word strings "battering ram", "battering" and "batter" of the main candidate list, which are stored in the first voice output candidate storage region 95, are displayed as a list (Step T32).

Figure 11D:

Then, as shown in FIG. 11D, the down key of the cursor keys 2e is operated by the user, and the translation/decision key 2b is operated (Step T33). Then, the voice data of the selected word string "battering" is outputted as a voice (Step T34).

Operation Example 2

Figure 12A:
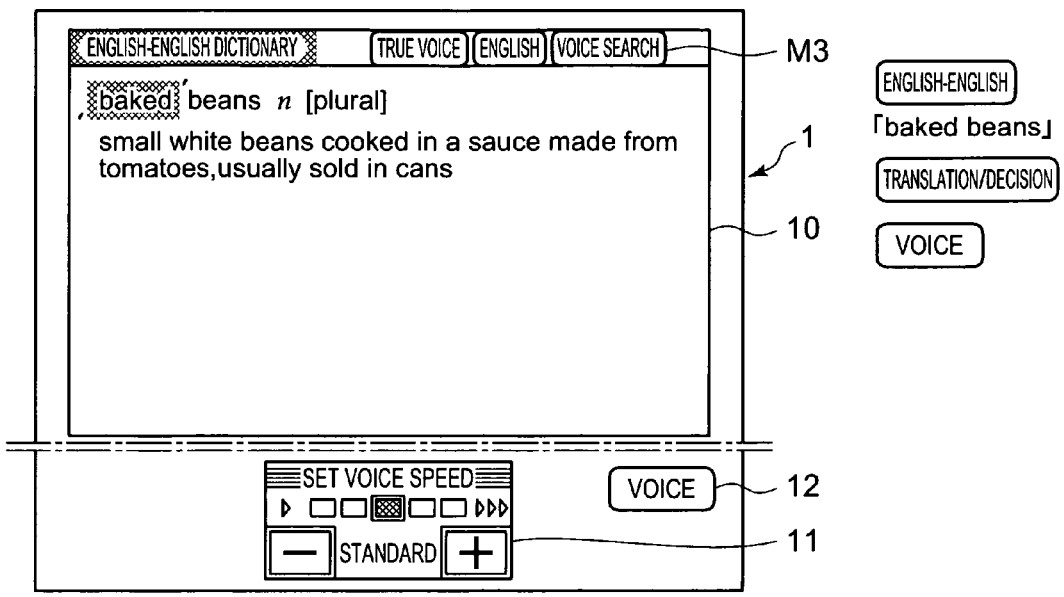
FIGS. 12A to 12C are conceptual views showing display contents and the like in the dictionary retrieval processing.

For example, as shown in FIG. 12A, the dictionary database 84b of the English-English dictionary is selected by the user (Step S1), and "baked beans" is inputted as the retrieval character string (Step S3), and thereafter, the translation/decision key 2b is operated for a candidate "baked beans" for the headword (Step S12: Yes). Then, explanatory information for the headword "baked beans" designated so as to be highlighted is fully displayed (Step S13).

Next, when the voice output key 2h is operated by the user (Step S21: Yes), the voice search mark M3 is displayed on the main display 10, and the speed setting screen for the voice output is displayed on the sub display 11 (Step T11).

Figure 12B:
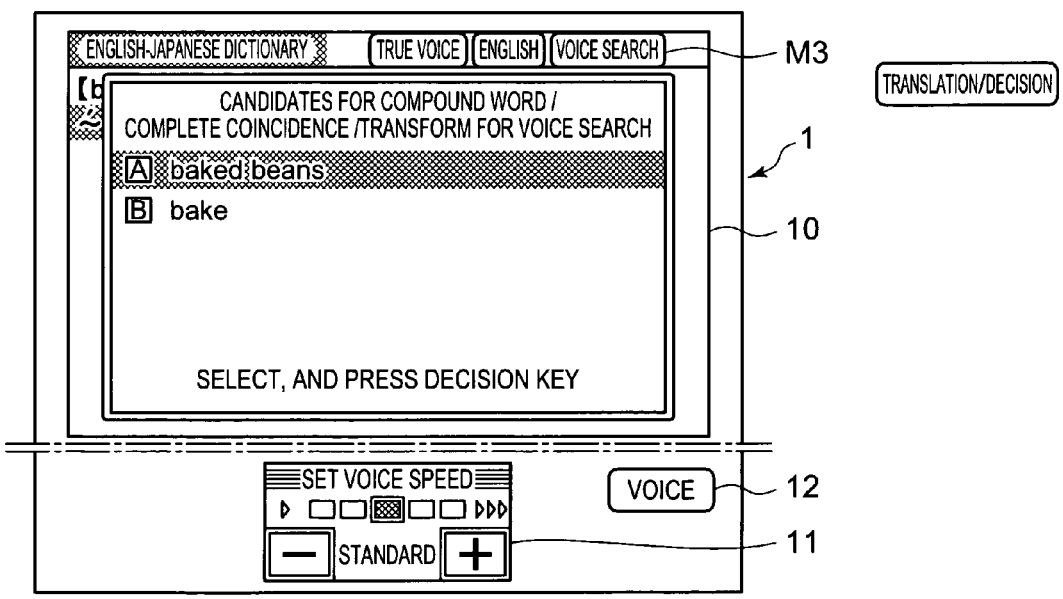

Next, the top word "baked" of the explanatory information displayed on the main display 10 is designated so as to be highlighted (Step T12), and thereafter, the translation/decision key 2b is operated by the user (Step T15: Yes). Then, as shown in FIG. 12B, a headword "bake" which completely coincides with the word "baked" designated so as to be highlighted and with a transformed word "bake" thereof, is retrieved from the voice database 83, and is added to the main candidate list of the first voice output candidate storage region 95 (Step T17).

Next, a compound word "baked beans" which partially coincides with a word string "baked beans" that contains a word rearward by at least one from the designated word "baked", is retrieved from the voice database 83, and is added to the sub candidate list of the second voice output candidate storage region 96 (Step T18).

Next, a compound word which partially coincides with a word string that contains a word forward by at least one from the designated word "baked", is retrieved. However, in this case, no compound word is present forward of the designated word "baked", and accordingly, no compound word is detected (Step T18).

Next, the compound word "baked beans" in the sub candidate list of the second voice output candidate storage region 96 and the word string "baked beans" that contains the designated word and is displayed on the main display 10 are compared with each other, and the compound word "baked beans" that completely coincides with the word string is added to the main candidate list of the first voice output candidate storage region 95 (Step T20).

Next, the word strings "baked beans" and "bake" of the main candidate list, which are stored in the first voice output candidate storage region 95, are displayed as a list (Step T32).

Figure 12C:

Then, as shown in FIG. 12C, the translation/decision key 2b is operated by the user (Step T33). Then, the voice data of the selected word string "baked beans" is outputted as a voice (Step T34).

Operation Example 3

Figure 13A:
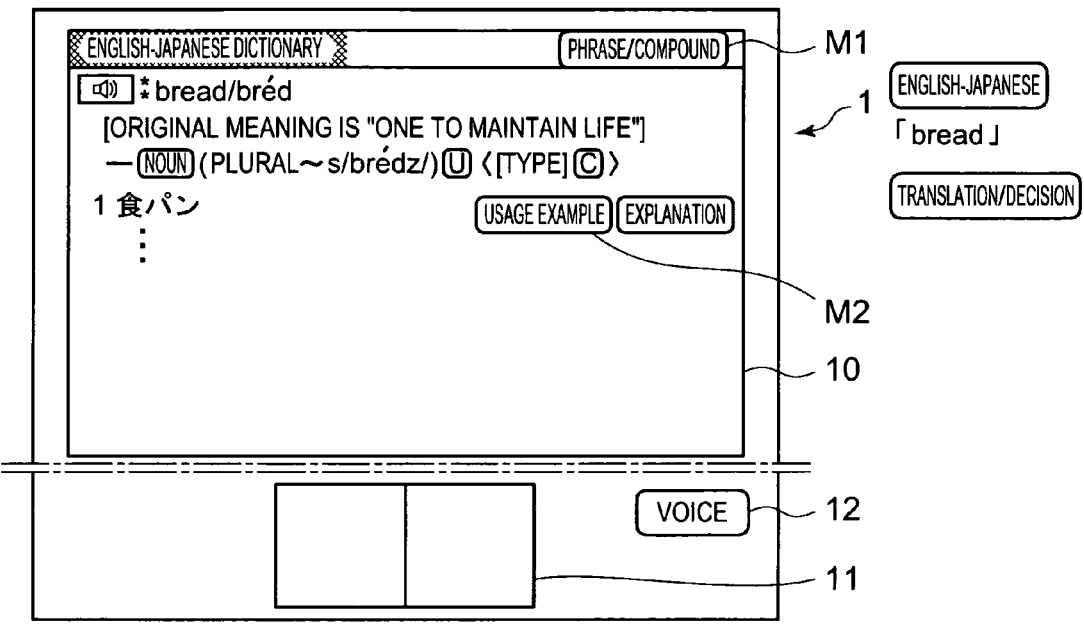
FIGS. 13A to 13D are conceptual views showing display contents and the like in the dictionary retrieval processing.

For example, as shown in FIG. 13A, the dictionary database 84a of the English-Japanese dictionary is selected by the user (Step S1), and "bread" is inputted as the retrieval character string (Step S3), and thereafter, the translation/decision key 2b is operated for a candidate "bread" for the headword (Step S12: Yes). Then, explanatory information for the headword "bread" designated so as to be highlighted is fully displayed (Step S13).

Figure 13B:
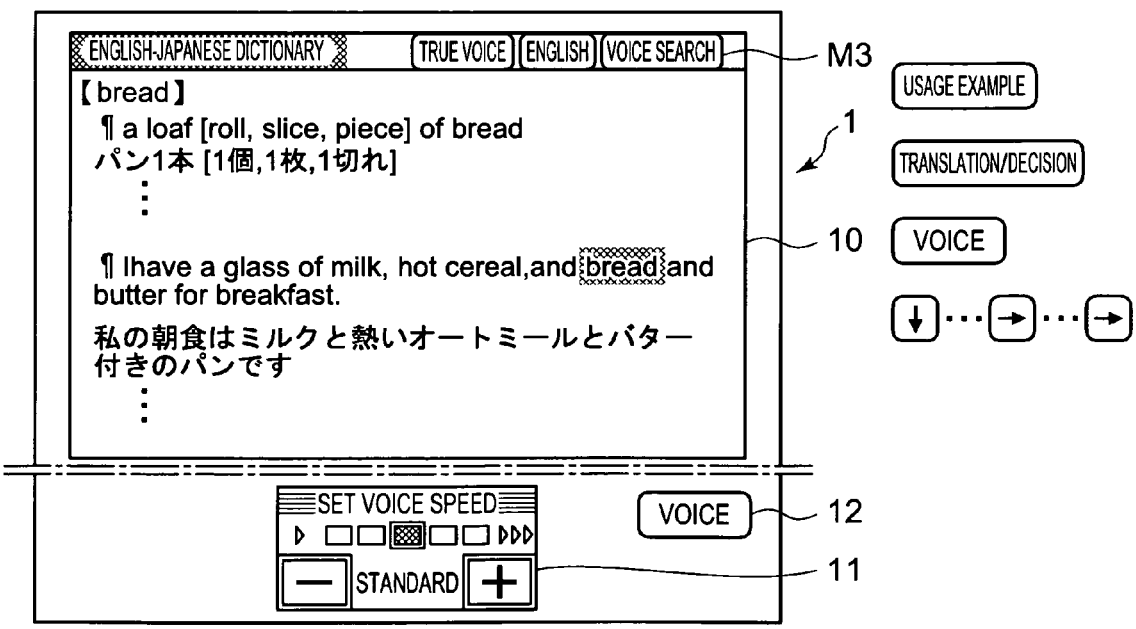

Next, as shown in FIG. 13B, when the usage example key 2i is operated by the user (Step S31: Yes), and the translation/decision key 2b is operated for usage examples in a meaning content "Shokupan" (Step S33), the usage examples of the headword "bread" in the meaning content "Shokupan" are fully displayed (Step S34).

Next, when the voice output key 2h is operated by the user (Step S35: Yes), the voice search mark M3 is displayed on the main display 10, and the speed setting screen for the voice output is displayed on the sub display 11 (Step T11).

Next, the top word "bread" of the explanatory information displayed on the main display 10 is designated so as to be highlighted (Step T12), and thereafter, the down key and right key of the cursor keys 2e are operated a plurality of times by the user (Step T13: Yes). Then, in the cursor direction, a word "bread" in a usage example "I have a glass of milk, hot cereal, and bread and butter for breakfast." is designated so as to be highlighted (Step T14).

Figure 13C:
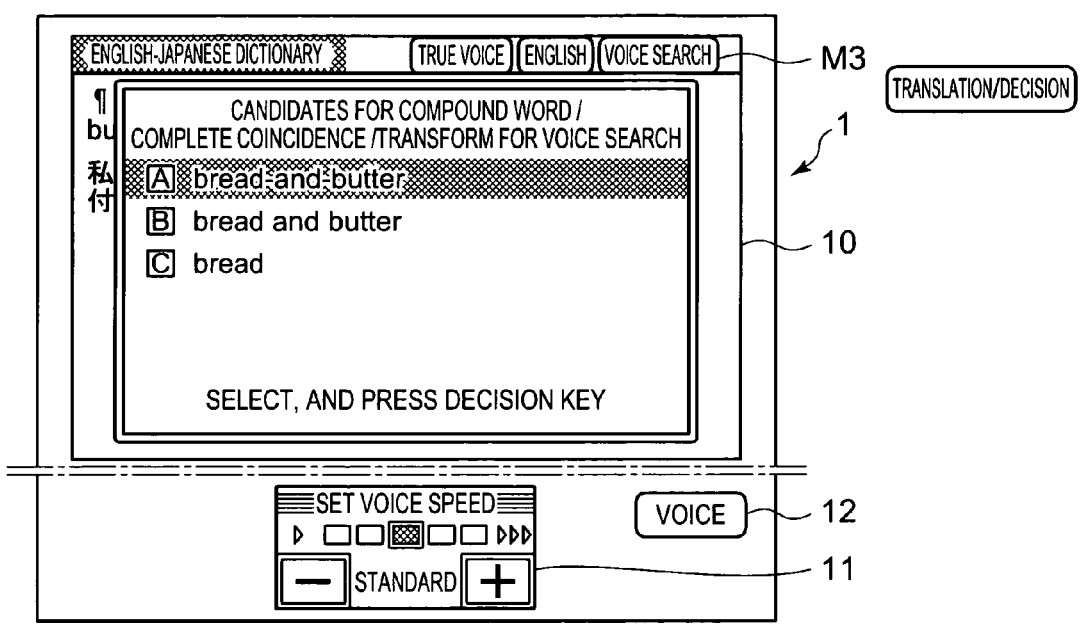

Next, as shown in FIG. 13C, when the translation/decision key 2b is operated by the user (Step T15: Yes), a headword "bread" which completely coincides with the designated word "bread", is retrieved from the voice database 83, and is added to the main candidate list of the first voice output candidate storage region 95 (Step T17).

Next, compound words "bread and butter" and "bread-and-butter" which partially coincide with word strings "bread and" and "bread and butter", each containing a word rearward by at least one from the designated word "bread", with a transformed word string "bread-and-butter", and the like, are retrieved from the voice database 83, and are added to the sub candidate list of the second voice output candidate storage region 96 (Step T18).

Next, a compound word which partially coincides with a word string "and bread" and the like that contains a word forward by at least one from the designated word "bread", is retrieved. However, in this retrieval, no compound word is detected (Step T18).

Next, the compound words "bread and butter" and "bread-and-butter" in the sub candidate list of the second voice output candidate storage region 96 are compared with the word strings "bread and butter" . . . and the transformed word strings "bread-and-butter" . . . thereof, which contain the designated word and are displayed on the main display 10. Then, the compound words "bread and butter" and "bread-and-butter", which completely coincide with the word strings or the transformed word strings thereof, are added to the main candidate list of the first voice output candidate storage region 95 (Step T20).

Next, the word strings "bread-and-butter", "bread and butter" and "butter" of the main candidate list, which are stored in the first voice output candidate storage region 95, are displayed as a list (Step T32).

Figure 13D:

Then, as shown in FIG. 13D, the down key of the cursor keys 2e is operated, and the translation/decision key 2b is operated by the user (Step T33). Then, the voice data of the selected word string "bread and butter" is outputted as a voice (Step T34).

Figure 14A:
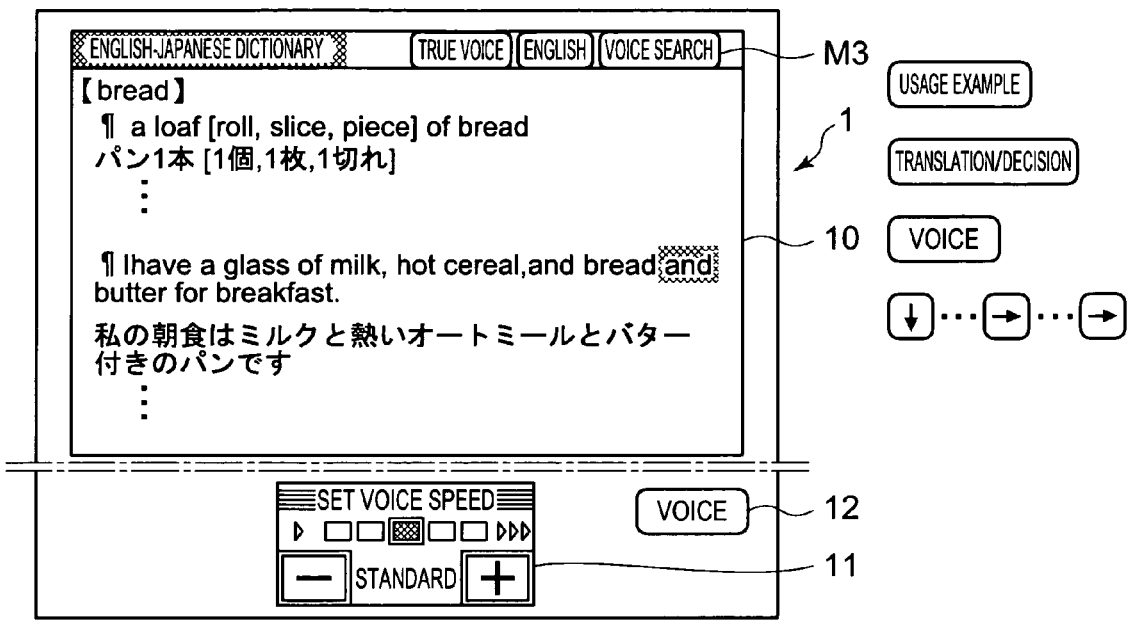
FIGS. 14A and 14B are conceptual views showing display contents and the like in the dictionary retrieval processing.
Figure 14B:
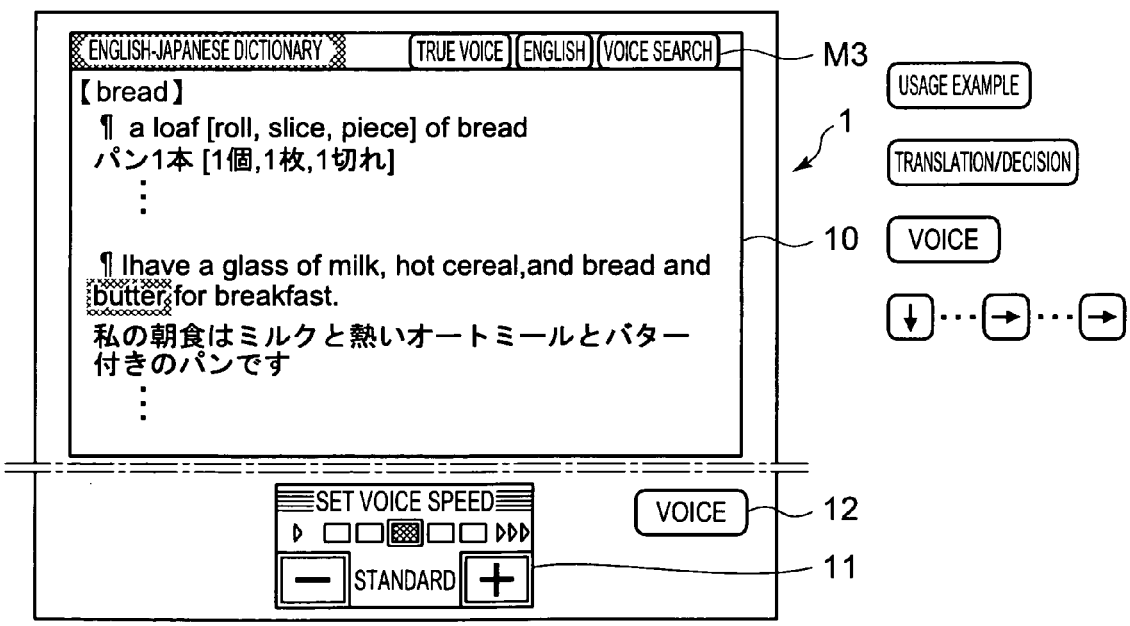

Note that, in the above-described operation example, the description has been made of the case where the translation/decision key 2b is operated in a state where the word "bread" in the usage example "I have a . . . bread and butter . . . " is designated so as to be highlighted as shown in FIG. 13B; however, even if the translation/decision key 2b is operated in a state where "and" and "butter" are designated so as to be highlighted as shown in FIGS. 14A and 14B, similar processing is performed.

In accordance with the electronic dictionary 1 described above, as shown in Steps T18 to T20 of FIG. 8 and in FIG. 11A to FIG. 14B, the compound word in which the voice data is stored is detected from among the plurality of words in the text containing the designated word, and the voice data corresponding to the detected compound word is outputted as a voice. Accordingly, any word contained in the compound word is designated, whereby the compound word can be outputted as a voice. Hence, in comparison with the conventional one, the compound word can be outputted as voice by simple operations.

Moreover, as shown in Steps T17 to T20 of FIG. 8 and in FIG. 12A to FIG. 13D, one compound word in which at least one constituent word is converted into the transformed word is detected as the compound word displayed in the text. Accordingly, even if the compound word in the text is the transformed one with respect to the compound word stored in association with the voice data, the compound word can be outputted as a voice.

Moreover, as shown in Step T32 of FIG. 9 and in FIG. 13C and the like, as the voice output candidates to be outputted as a voice, the designated word and each of the detected compound words are displayed in a list, and the voice data corresponding to any of the voice output candidates is outputted as a voice based on the operation by the user. Accordingly, it is possible to select whether the compound word is to be outputted as a voice or it is possible to select the designated word to be outputted as a voice. Moreover, when a plurality of the detected compound words is present, it is possible to select which of the compound words is to be outputted as a voice.

Moreover, as shown in Steps S3 and S4 of FIG. 6 and in FIG. 13A and the like, when any headword in the dictionary database is designated based on the operation by the user, the explanatory information corresponding to the headword concerned is retrieved from the dictionary databases 84, and the retrieved explanatory information is displayed in a text. Accordingly, any word in the explanatory information is designated so as to be highlighted. Thereby, the compound word in the explanatory information can be outputted as a voice.

Modification Example

Subsequently, a description will be made of the electronic dictionary in the above-described embodiment. Note that the same reference numerals are assigned to similar members to those of the above-described embodiment, and a description thereof will be omitted.

As shown in FIG. 2 described above, an electronic dictionary 1A in this modification example includes a flash ROM 80A, and this flash ROM 80A stores a voice output program 81A.

This voice output program 81A is a program for allowing the CPU 20 to execute dictionary retrieval processing (refer to FIGS. 6, 7, 9, 15 and the like) to be described later.

Figure 15:
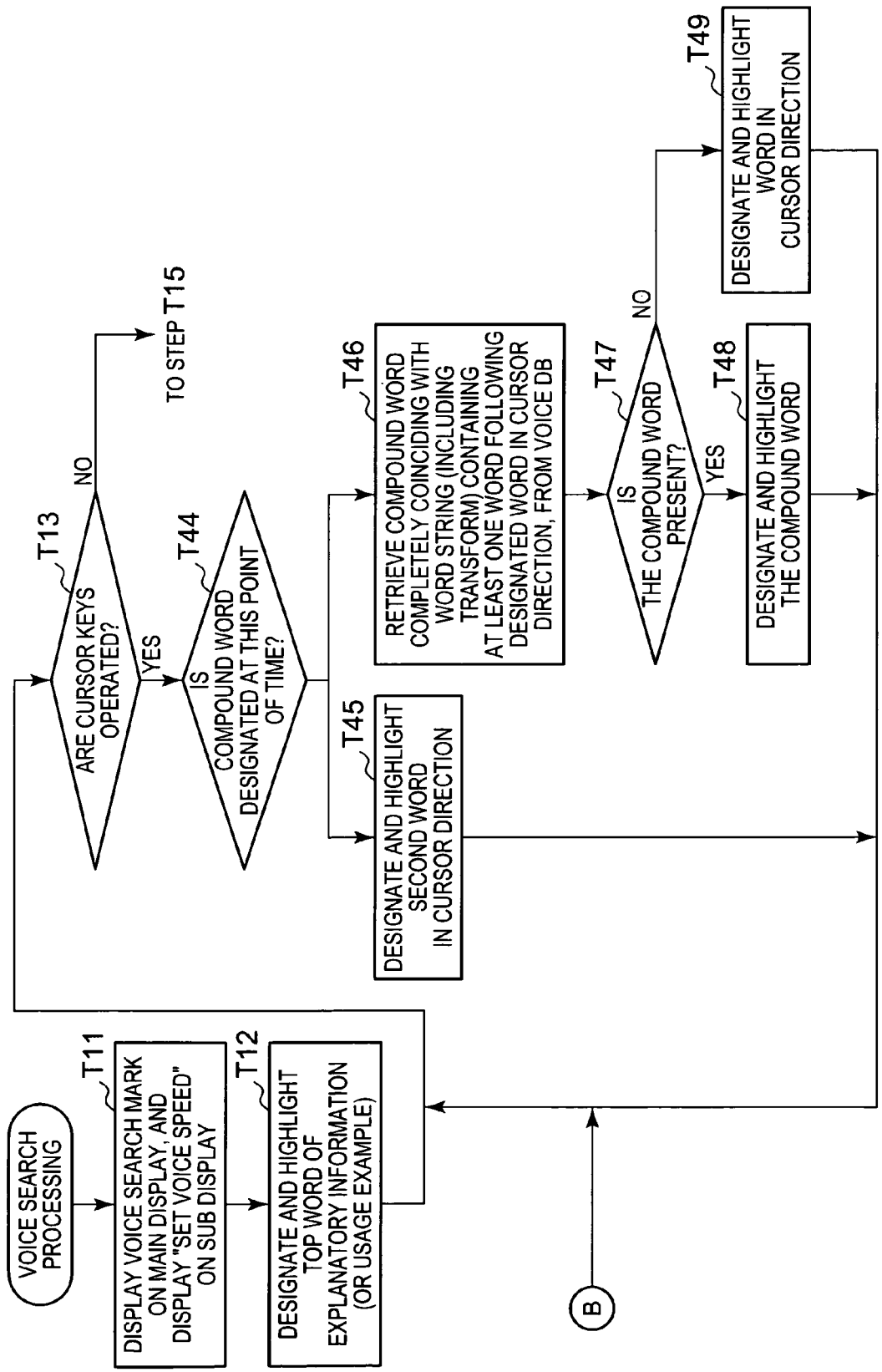
FIG. 15 is a flowchart showing operations in the voice search processing.

Subsequently, a description will be made of operations of the electronic dictionary 1A. FIGS. 6 and 7, Steps T15 to T21 of FIG. 8, FIG. 9, and FIG. 15 are flowcharts showing a flow of dictionary retrieval processing which the CPU 20 executes by reading out the voice output program 81. Note that, in comparison with the operations of the above-mentioned electronic dictionary 1, the operations of the electronic dictionary 1A are mainly different in the processing of Step T14 (refer to FIG. 8). Accordingly, a description will be made of the processing after the cursor keys 2e are operated (Step T13: Yes) in Step T13.

Specifically, as shown in FIG. 15, first, in the case that it is determined in Step T13 that the cursor keys 2e are operated (Step T13: Yes), the CPU 20 determines whether or not a compound word is designated so as to be highlighted at this point of time (Step T44). In the case that it is determined that the compound word is designated so as to be highlighted (Step T44: Yes), the CPU 20 designates a second word of the compound word in the cursor direction so that the second word can be highlighted (Step T45), and proceeds to the processing of Step T13.

Meanwhile, in the case that it is determined that the compound word is not designated so as to be highlighted (Step T44: No), the CPU 20 retrieves a compound word which completely coincides with a word string that contains at least one word following the designated word at this point of time in the cursor direction and with a transformed word string of this word string, from the voice database 83 (Step T46). Then, the CPU 20 determines whether or not the detected compound word is present as a result of the retrieval (Step T47).

Next, in the case that it is determined that the compound word is present (Step T47: Yes), the CPU 20 designates the compound word to be highlighted (Step T48), and proceeds to the processing of Step T13. In the case that it is determined that the compound word is not present (Step T47: No), the CPU 20 designates one word following the designated compound word in the cursor direction so as to be highlighted (Step T49), and then proceeds to the processing of Step T13.

Note that, in this modification example, when the translation/decision key 2b is operated in Step T15 (refer to FIG. 8) in the state where the compound word is designated so as to be highlighted by the processing of Step T48 described above (Step T15: Yes), the CPU 20 outputs voice data corresponding to the compound word, as a voice, in place of performing the processing of Steps T17 to T20 and Steps T31 to T34 (refer to FIG. 9).

In such a way, for example, as shown in FIG. 16A, when the right key of the cursor keys 2e is operated in the state where the word "and" in the usage example "I have a glass of milk, hot cereal, and bread and butter for breakfast." is designated so as to be highlighted by similar operations to those of FIGS. 11A and 11B (Step T13: Yes), it is determined that the compound word is not designated so as to be highlighted (Step T44: No). Accordingly, a compound word which completely coincides with a word string "and bread . . . " that contains at least one word from the designated word "and" in the cursor direction (right direction), is retrieved in the voice database 83 (Step T46), and then, it is determined that the compound word is not present (Step T47: No). Then, as shown in FIG. 16B, the word "bread" in the cursor direction (right direction) is designated so as to be highlighted (Step T49).

Moreover, when the right key of the cursor keys 2e is further operated in this state (Step T13: Yes), it is determined that no compound word is designated so as to be highlighted at this point of time (Step T44: No). Accordingly, a compound word which completely coincides with a word string "bread and . . . " that contains at least one word from the designated word "bread" in the cursor direction (right direction), is retrieved in the voice database 83 (Step T46), and then, it is determined that a compound word "bread and butter" is present (Step T47: Yes). Then, as shown in FIG. 16C, the compound word "bread and butter" is designated so as to be highlighted (Step T48).

Moreover, when the right key of the cursor keys 2e is further operated in this state (Step T13: Yes), it is determined that the compound word "bread and butter" is designated so as to be highlighted at this point of time (Step T44: Yes). Accordingly, a second word "and" of the compound word "bread and butter" in the cursor direction (right direction) is designated so as to be highlighted as shown in FIG. 16D (Step T45).

Moreover, when the right key of the cursor keys 2e is further operated in this state (Step T13: Yes), it is determined that no compound word is designated so as to be highlighted at this point of time (Step T44: No). Accordingly, a compound word which completely coincides with a word string "and butter . . . " that contains at least one word from the designated word "and" in the cursor direction (right direction), is retrieved in the voice database 83 (Step T46), and then, it is determined that no compound word is present (Step T47: No). Then, as shown in FIG. 16E, the word "butter" in the cursor direction (right direction) is designated so as to be highlighted (Step T49).

Moreover, when the right key of the cursor keys 2e is further operated in this state (Step T13: Yes), it is determined that no compound word is designated so as to be highlighted at this point of time (Step T44: No). Accordingly, a compound word which completely coincides with a word string "butter for . . . " that contains at least one word from the designated word "butter" in the cursor direction (right direction), is retrieved in the voice database 83 (Step T46), and then, it is determined that no compound word is present (Step T47: No). Then, as shown in FIG. 16F, the word "for" in the cursor direction (right direction) is designated so as to be highlighted (Step T49).

Moreover, when the left key of the cursor keys 2e is further operated in this state (Step T13: Yes), it is determined that no compound word is designated so as to be highlighted at this point of time (Step T44: No). Accordingly, a compound word which completely coincides with a word string " . . . butter for" that contains at least one word from the designated word "for" in the cursor direction (left direction), is retrieved in the voice database 83 (Step T46), and then, it is determined that no compound word is present (Step T47: No). Then, as shown in FIG. 16G, the word "butter" in the cursor direction (left direction) is designated so as to be highlighted (Step T49).

Moreover, when the left key of the cursor keys 2e is further operated in this state (Step T13: Yes), it is determined that no compound word is designated so as to be highlighted at this point of time (Step T44: No). Accordingly, a compound word which completely coincides with a word string " . . . and butter" that contains at least one word from the designated word "butter" in the cursor direction (left direction), is retrieved in the voice database 83 (Step T46), and then, it is determined that the compound word "bread and butter" is present (Step T47: Yes). Then, as shown in FIG. 16H, the compound word "bread and butter" is designated so as to be highlighted (Step T48).

Moreover, when the left key of the cursor keys 2e is further operated in this state (Step T13: Yes), it is determined that the compound word "bread and butter" is designated so as to be highlighted at this point of time (Step T44: Yes). Accordingly, as shown in FIG. 16I, a second word "and" of the compound word "bread and butter" in the cursor direction (left direction) is designated so as to be highlighted (Step T45).

Moreover, when the left key of the cursor keys 2e is further operated in this state (Step T13: Yes), it is determined that no compound word is designated so as to be highlighted at this point of time (Step T44: No). Accordingly, a compound word which completely coincides with a word string " . . . bread and" that contains at least one word from the designated word "and" in the cursor direction (left direction), is retrieved in the voice database 83 (Step T46), and then, it is determined that no compound word is present (Step T47: No). Then, as shown in FIG. 16J, the word "bread" in the cursor direction (left direction) is designated so as to be highlighted (Step T49).

Moreover, when the left key of the cursor keys 2e is further operated in this state (Step T13: Yes), it is determined that no compound word is designated so as to be highlighted at this point of time (Step T44: No). Accordingly, a compound word which completely coincides with a word string " . . . and bread" that contains at least one word from the designated word "bread" in the cursor direction (left direction), is retrieved in the voice database 83 (Step T46), and then, it is determined that no compound word is present (Step T47: No). Then, as shown in FIG. 16K, the word "and" in the cursor direction (left direction) is designated so as to be highlighted (Step T49).

In accordance with the electronic dictionary 1A described above, as shown in Step T48 of FIG. 15 and FIGS. 16A to 16K, the voice data corresponding to the designated compound word designated so as to be highlighted based on the operation by the user is outputted as a voice. Accordingly, by designating the compound word, the compound word concerned can be outputted as a voice. Hence, in comparison with the conventional one, the compound word can be outputted as a voice by simple operations.

Moreover, as shown in Step T45 of FIG. 15 and FIGS. 16A to 16K, any word in the designated compound words is designated so as to be highlighted based on the operation by the user. Accordingly, the display state can be changed from the state where the compound word is designated so as to be highlighted to the state where the word is designated so as to be highlighted.

Note that embodiments to which the present invention is applicable are not limited to the above-described embodiments, and are appropriately modifiable within the scope without departing from the gist of the present invention.

For example, although the description has been made on the assumption that the voice output device according to the present invention is the electronic dictionary 1, the devices to which the present invention is applicable are not limited to the electronic dictionary, and the voice output device according to the present invention is applicable to electronic instruments in general, such as a cellular phone and a personal computer. Moreover, the voice output program 81 according to the present invention may be stored in a memory card, a CD, and the like, which are removable from the electronic dictionary 1.

Moreover, although the description has been made on the assumption that the words in the explanatory information and usage examples of the headword are designated so as to be highlighted in order to output the compound word as a voice, for example, words in text that is downloaded from an external instrument and is displayed may be designated so as to be highlighted.

Furthermore, the description has been made on the assumption that, in the case that it is determined in Step T15 that the translation/decision key 2b is operated (Step T15: Yes), the CPU 20 performs the processing of Steps T17 to T20, and the voice output candidates in the main candidate list of the first voice output candidate storage region 95 are stored. However, after retrieving the entire word strings which are contained in the designated word and are stored in the voice database 83, and storing the entire word strings in the second voice output candidate storage region 96, it may be determined whether or not each of the word strings completely coincides with a word string in the text or with a transformed word string thereof, and the word string that completely coincides therewith may be stored as the voice output candidate in the first voice output candidate storage region 95.

What is claimed is:

1. A voice output device, comprising:
   a compound word voice data storage unit that stores voice data respectively associated with a plurality of compound words each of which includes a plurality of words;
   a text display unit that displays text containing a plurality of words;
   a word designation unit that designates a word from among the plurality of words in the text displayed by the text display unit as a designated word based on a user's operation;
   a headword addition unit that retrieves a designated headword coinciding with the designated word, and adds the designated headword to a candidate list;
   a compound word addition unit that retrieves, from the compound word voice data storage unit, a compound word which includes the designated word and a word consecutive to the designated word in a given direction, and adds the compound word to the candidate list when the compound word is retrieved;
   a candidate list display unit that displays the designated headword added to the candidate list by the headword addition unit and the compound word added to the candidate list by the compound word addition unit, in a list form;
   a candidate choice unit that chooses, based on the user's operation, between the designated headword and the compound word displayed by the candidate list display unit; and
   a voice output unit that outputs voice data associated with the designated headword or voice data associated with the compound word chosen by the candidate choice unit as a voice.

2. The voice output device according to claim 1, further comprising:
   a dictionary storage unit that stores dictionary information comprising plural pieces of explanatory information which are respectively associated with a plurality of headwords;
   a headword designation unit that designates a headword from among the plurality of headwords in the dictionary information as a designated headword based on the user's operation; and
   a retrieval unit that retrieves a piece of the explanatory information associated with the designated headword from the dictionary information,
   wherein the text display unit comprises an explanatory information display unit that displays the piece of the explanatory information retrieved by the retrieval unit as the text.

3. The voice output device according to claim 1, further comprising a direction indication unit that indicates a direction of processing based on the user's operation,
   wherein the compound word addition unit comprises:
      a rearward compound word addition unit that retrieves, when the direction indication unit indicates a rear direction of the retrieval, a rearward compound word coinciding with a character string including the designated word and a word consecutive to the designated word in the rear direction in the text, and adds the rearward compound word to the candidate list when the rearward compound word is retrieved; and
      a forward compound word addition unit that retrieves, when the direction indication unit indicates a front direction of the retrieval, a forward compound word coinciding with a character string including the designated word and a word consecutive to the designated word in the front direction in the text, and adds the forward compound word to the candidate list when the forward compound word is retrieved, and
   wherein when the direction indication unit indicates a left direction, the candidate list display unit displays the designated headword added to the candidate list by the headword addition unit and the forward compound word added to the candidate list by the forward compound word addition unit, in the list form.

4. The voice output device according to claim 1, further comprising a voice output speed control unit that controls a voice output speed of the voice output by the voice output unit.

5. A non-transitory computer-readable storage medium having stored thereon a voice output program that causes a computer to function as units comprising:
- a compound word voice data storage unit that stores voice data respectively associated with a plurality of compound words each of which includes a plurality of words;
- a text display unit that displays text containing a plurality of words;
- a word designation unit that designates a word from among the plurality of words in the text displayed by the text display unit as a designated word based on a user's operation;
- a headword addition unit that retrieves a designated headword coinciding with the designated word, and adds the designated headword to a candidate list;
- a compound word addition unit that retrieves, from the compound word voice data storage unit, a compound word which includes the designated word and a word consecutive to the designated word in a given direction, and adds the compound word to the candidate list when the compound word is retrieved;
- a candidate list display unit that displays the designated headword added to the candidate list by the headword addition unit and the compound word added to the candidate list by the compound word addition unit, in a list form;
- a candidate choice unit that chooses, based on the user's operation, between the designated headword and the compound word displayed by the candidate list display unit; and
- a voice output unit that outputs voice data to associated with the designated headword or voice data associated with the compound word chosen by the candidate choice unit as a voice.

* * * * *